March 18, 1941.    W. J. BROWN, JR    2,235,355
MOTION PICTURE TITLING APPARATUS
Filed June 21, 1939    3 Sheets-Sheet 1
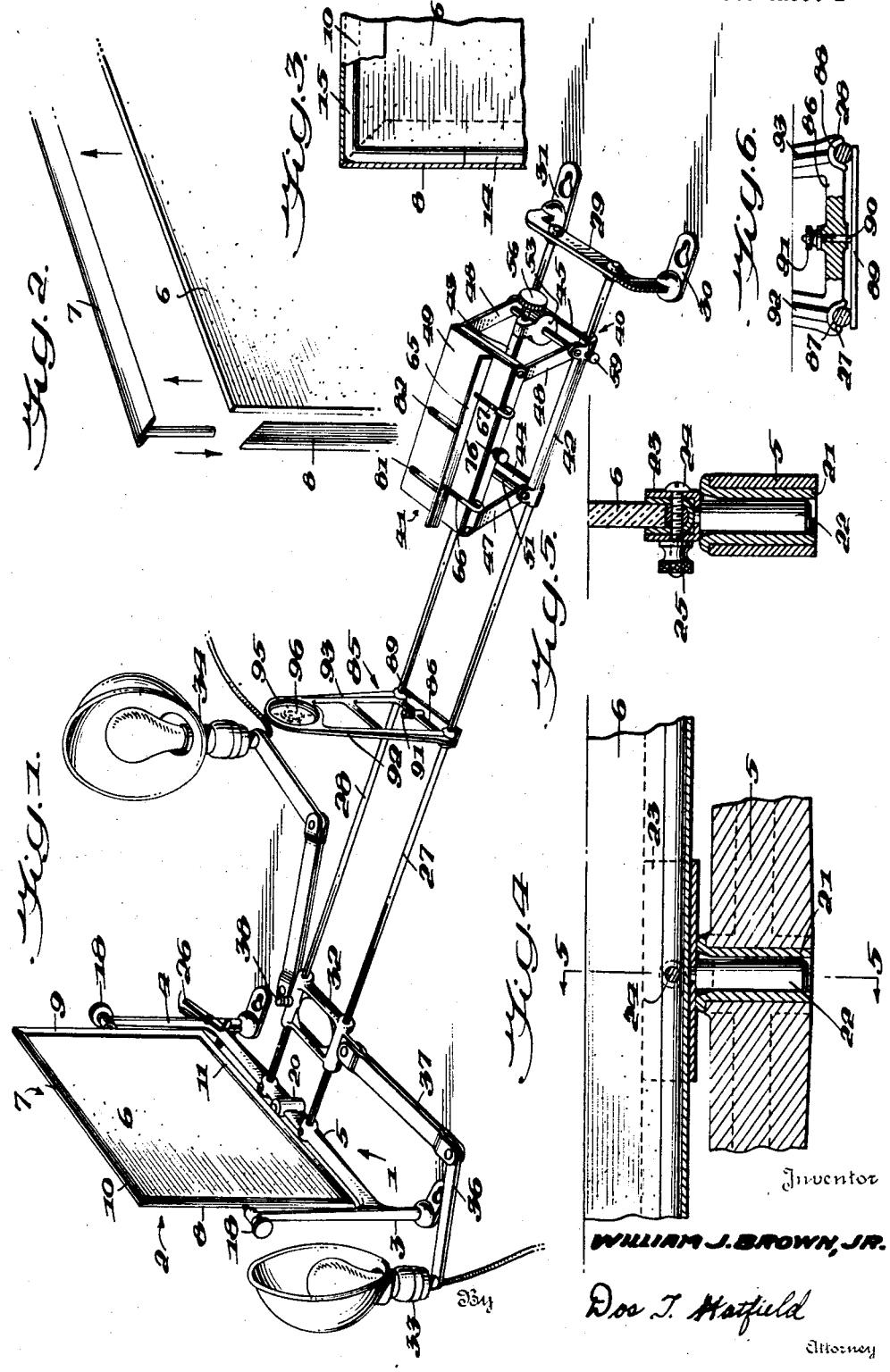
Inventor
WILLIAM J. BROWN, JR.
Doc T. Hatfield
Attorney

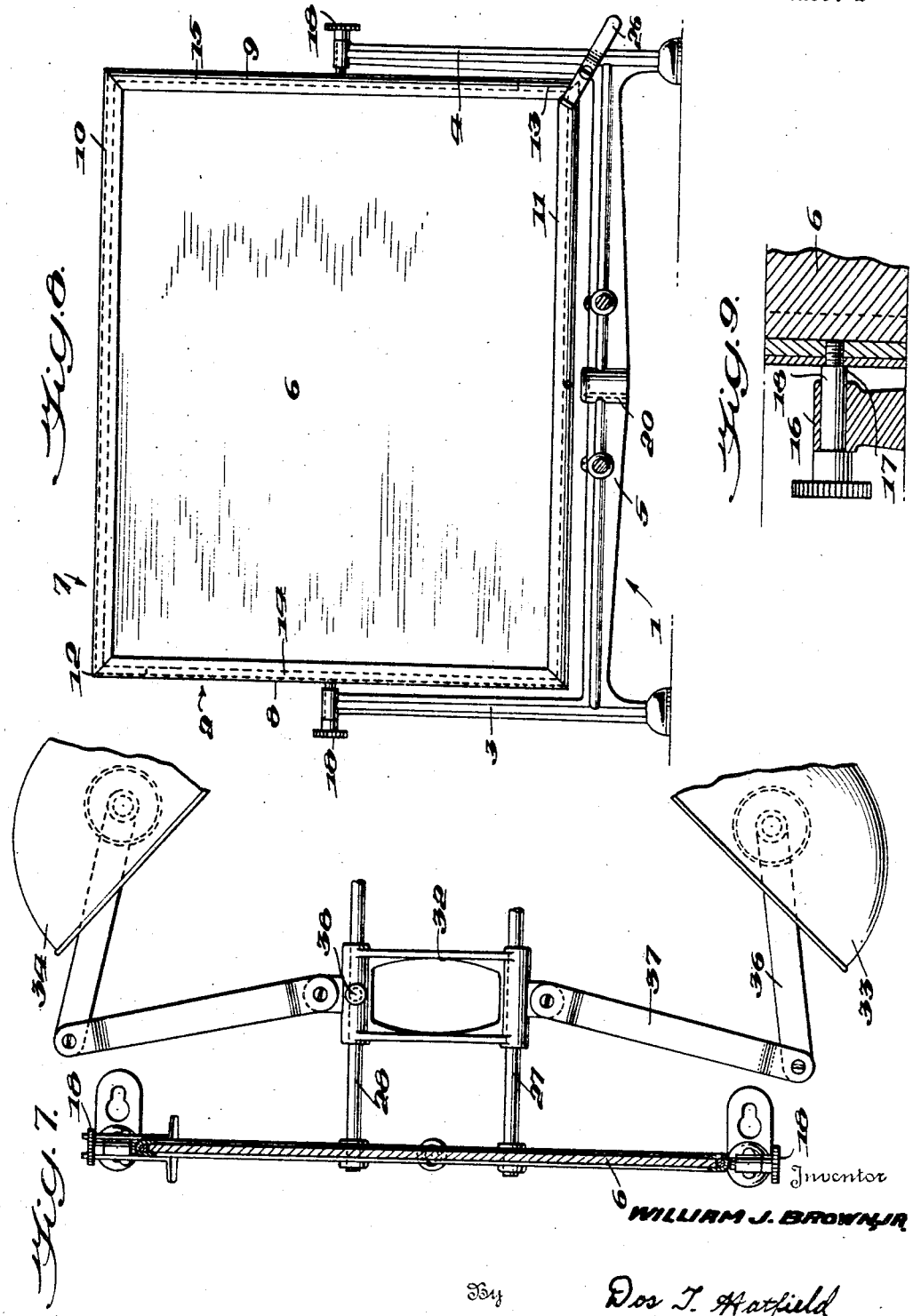

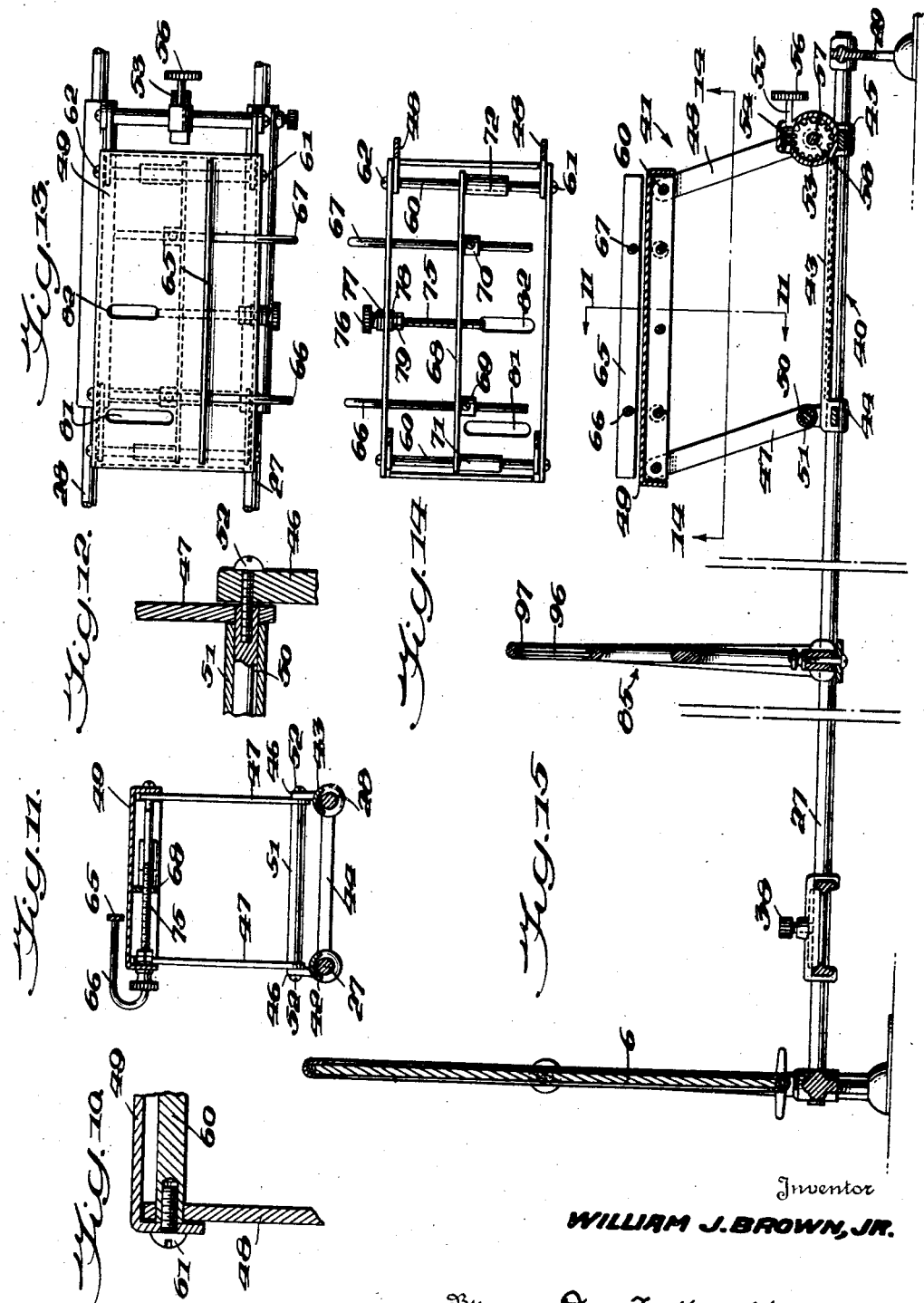

Patented Mar. 18, 1941

2,235,355

UNITED STATES PATENT OFFICE 2,235,355

MOTION PICTURE TITLING APPARATUS

William J. Brown, Jr., Irvington, N. J., assignor to American Bolex Company, Inc., New York, N. Y., a corporation of New York Application June 21, 1939, Serial No. 280,424

22 Claims. (Cl. 88—24)

This invention relates to an apparatus for making titles for motion pictures, wherein pictures are taken by a camera, so that the titles are recorded on motion picture film.

An object of this invention is to provide an apparatus for making titles wherein the camera lens may be aligned with minute accuracy with the title.

Another object of the invention is to provide an apparatus wherein any camera, regardless of its make, style or size may have its lens quickly and easily aligned with the title.

Another object of this invention is to enable the operator to record titles on motion picture film in a plurality of different ways so that the titles, when projected on the screen, have variety.

Another object of the invention is to provide a device which is capable of enabling a camera to record pleasing and unusual titles on the film with minute accuracy in every respect.

Another object of the invention is to enable a plurality of titles to be recorded on the film in succession without stopping the operation of the camera between changes of the titles, so that there is no break between the titles when the same are projected on the screen.

Still another object of the invention is to obtain proper light shadows on the title and/or to obtain back lighting on the title, so that the projected title is more pleasing to the eye.

Another object is to provide an apparatus which enables clear, sharp titles to be recorded on the film wherein either a fixed focus lens or a focusing lens is used on the camera.

Another object of this invention is to provide a device which can be operated by a novice, and yet the titles, as projected on the screen, will appear as of professional origin.

Another object of this invention is to make titling a pleasant, easy task wherein expert results are obtained.

With the foregoing and other objects in view, this invention embodies the feature of construction, combination and arrangement of parts as will hereinafter more fully be described in detail, illustrated in the accompanying drawings, which disclose the preferred embodiment of the invention, and set out in the claims appended hereto.

In the drawings—

Figure 1 is a perspective view of the invention showing the assembled apparatus;

Figure 2 is an exploded perspective detail view of the title holder;

Figure 3 is a fragmentary view in section showing the assembly of the parts of Figure 2;

Figure 4 is a detail view in section of the vertical swivel support for the title holder;

Figure 5 is a sectional view taken on line 5—5 of Figure 4;

Figure 6 is a detail view partly in section of the upright aligning member;

Figure 7 is a top view partly in section of the title holder and lamp assembly;

Figure 8 is an elevation of the title holder and stand;

Figure 9 is a sectional view of one of the trunnion supports for the title holder;

Figure 10 is a fragmentary sectional view showing the assembly of the camera support;

Figure 11 is a sectional view on line 11—11 of Figure 15;

Figure 12 is a detail view in section of the camera support;

Figure 13 is a top plan view of the camera support;

Figure 14 is a bottom sectional view on line 14—14 of Figure 15; and,

Figure 15 is a sectional elevation of the assembled device.

Referring now to Figure 1, reference character 1 generally indicates a stand for supporting a title holder generally indicated at 2. This stand consists of upright members 3 and 4 which are formed integrally with a cross member 5. The title holder 2 may be formed of a sheet 6 of any suitable material, such as opaque cork or transparent glass, and may be colored or tinted as desired. The sheet 6 is provided with a frame or casing generally indicated at 7. This casing 7 may be formed of sheet metal side pieces 8 and 9, a top piece 10 and a bottom piece 11. These top and side pieces are formed U-shaped in cross section so that they cover and protect the edges of the sheet 6. The side piece 8 and bottom piece 11 are joined together as by brazing, and the side piece 9 and top piece 10 are similarly joined. This arrangement provides for separation of the frame 7 at its corners 12 and 13 (see particularly Fig. 8). The frame is held together by means of rods 14 and 15 (see Figures 2, 3 and 8). The rod 14 is fitted in the U-shaped frame and extends from a point near the top side of side piece 8 downwardly to the bottom thereof, then along bottom piece 11, and then upwardly a short distance along side piece 9. The rod 15 extends in a similar manner in side piece 9, top piece 10 and side piece 8. The rods 14 and 15 snugly engage the interior of the frame members, serving therefore to frictionally hold the frame together, reinforce the same, and yet enabling the frame to be taken apart easily for removal or insertion of the sheet 6.

With reference to Figure 9, the upper ends of the upright members 3 and 4 are provided with bosses 16 which are provided with bores for receiving trunnion screws 18, which screw into threaded openings in the side pieces 8 and 9 of the frame 7. The arrangement provides for readily removing or mounting title holder generally indicated at 2 in the stand 1. The trunnion screws 18 are provided with shoulders 17 which prevent these screws from binding upon the bosses 16, thereby permitting the title holder 2 to rotate about the axis formed about the trunnion screws, i. e. a horizontal axis.

In some cases, it may be desired to rotate the title holder 2 about a vertical axis instead of a horizontal axis, and for this purpose, the cross piece 5 (see Figures 1, 4, 5 and 8) is provided at its center with a boss 20. This boss 20 is formed to receive a bushing 21 (see Figures 4 and 5) which receives a pin 22, forming a swivel support for a U-clamp 23. The bushing 21 is formed at its upper end to provide a bearing for the clamp 23, thereby permitting ready rotation of this clamp about its axis, i. e. a vertical axis. The clamp 23, as shown in Figure 5, is U-shaped in cross section for receiving the bottom piece 11 of the frame 7, and is provided with a screw 24 and knurled nut 25. This permits ready attachment of the clamp 23 to the title holder 2. It will be apparent that by removing the trunnion screws 18 and attaching the U-clamp 23 to the title holder, this title holder may be supported so as to rotate about a vertical axis.

Locking elements 26 (see Figures 1 and 8) are pivotally connected to the cross piece 5 and extend on each side of the frame 7. When the locking elements 26 are in the position as shown in Figure 8, the frame 7 and sheet 6 are held against rotation in either direction about a horizontal axis. It will be apparent that the same would be true if the frame 7 was mounted in the boss 20 for rotation about a vertical axis as shown in Figure 4. As shown in Figure 1, the locking elements are moved free of the frame 7, so that the frame may be rotated about either a horizontal or vertical axis, in accordance with the manner in which the same is mounted on the stand 1.

Referring again to Figure 1, rods 27 and 28 are attached to the cross member 5. These rods extend into suitable openings in the cross member 5 and are held in place preferably by set screws, so that, if desired, the stand 1 may be moved horizontally along said rods. The rods 27 and 28 extend rearwardly and parallel to a supporting bracket 29, this bracket 29 being U-shaped, and provided with feet 30 and 31. It will be noted at this point that similar feet are mounted at the bottom of the upright members 3 and 4 of the stand 1. These feet are provided with screw openings, so that the assembled apparatus may be mounted on any suitable support if so desired (not shown).

A bracket 32 is mounted upon the rods 27 and 28 for supporting lamps 33 and 34 (see Figures 1 and 7). The lamp 33 is secured to the bracket 32 by means of pivoted connecting arms 36 and 37, the lamp 34 being supported in the same manner. It will be apparent that by sliding the bracket along the rods 27 and 28, and by adjustment of the lamp supporting arms, the lamps may be independently placed in whatever locations are necessary for securing the desired lighting effect. If desired (particularly where the sheet 6 is of transparent material), the lamps 33 and 34 may be adjusted for directing light upon the rear of the sheet 6, thereby producing backlighting for the title. The sliding bracket 32 may be secured in any desired position on the rods 27 and 28 by the set screw 38.

Referring now to the right hand portions of the Figures 1 and 15, a carriage generally indicated at 40 is mounted upon the rods 27 and 28, this carriage forming part of the camera support generally indicated at 41. The carriage 40 consists of slides 42 and 43 which rest upon the rods 27 and 28, these slides being formed integrally with a front cross-member 44 and a rear cross-member 45. It will readily be seen that this carriage 40 may slide upon the rods 27 and 28 in a direction to and from the title stand 1. The carriage may be secured in any desired position by means of set screw 59. The carriage 40 is provided with upstanding lugs 46 (see Figure 11) for receiving front arms 47 and rear arms 48, which support the camera platform 49. The camera platform 49 is bent over on its side edges, the arms 47 and 48 being connected thereto. The front arms 47 receive a shaft 50 (see Figure 12) which extends laterally along the carriage 40, and fitting into suitable openings in said arms. Mounted over the shaft 50 is a spacer member 51 for spacing the arms. The shaft 50 is secured to the supporting lugs 46 by means of screws 52. Mounted upon the rear cross member 45 (see Figure 15) is a gear case 53, this gear case containing a worm gear 54 formed integrally on the shaft 55 which shaft is provided with a nob 56. The worm gear 54 cooperates with a pinion gear 57, this pinion gear being mounted upon a shaft 58 which extends between the rear arms 48. The shaft 58 is fixedly secured to the arms 48 for causing these arms to move as a unit upon rotation of said shaft. It will be apparent that by rotating the nob 56, the shaft 58 will be rotated through the gears 54 and 57, thereby permitting the platform 49 to be raised or lowered as desired. Thus when the nob is rotated in a direction for turning the shaft 58 clockwise, the arms 48 will be rotated simultaneously, thereby moving the platform upwardly and rearwardly. Upon rotation of the nob 56 in the opposite direction, the platform 49 will move forwardly and downwardly. The worm gear 54 and pinion gear 57 in addition serve to lock the platform 49 in any adjusted position.

Referring now to Figures 13, 14 and 15, the platform 49 is secured to the arms 48 by means of a shaft 60. This shaft being held in place by means of screws 61 and 62 which extend thru openings in the side edges of the platform 49. The front arms 47 are secured to the platform 49 in the same manner.

Located above the platform 49 is a camera aligning bar 65. This bar is secured to U-bolts 66 and 67 which extend laterally along the platform 49 around the left hand edge thereof, and then laterally beneath said platform. These U-bolts 66 and 67 are secured to a lower bar 68, which bar is located on the underside of the platform 49 and extends longitudinally thereto. The bar 68 is attached to collars 69 and 70, these collars receiving the U-bolts 66 and 67 and being fastened thereto by means of set screws. This arrangement permits ready adjustment of the lower bar 68 upon the U-bolts 66 and 67. The lower bar 68 is also attached to collars 71 and 72 which are mounted upon the bolts 60. The bolts 60 thus serve as guides for the bar 68 during its movement, these bolts acting to maintain the bar 68 parallel with the longitudinal axis of the platform 49 at all times. Received in the left hand side edge of the platform 49 is an adjustment screw 75, this adjustment screw extending laterally along the platform 49 and engaging the lower bar 68 which is threaded for this purpose. The adjusting screw 75 is provided at its end with a nob 76, a washer 77 being interposed between the side edge of the platform 49 and this nob. A washer 78 is located at the opposite side of the side edge of the platform 49 and is held into place by lock nut 79. This arrangement prevents longitudinal movement of the adjusting screw 75 in either direction. Therefore, by rotating the nob 76 the lower bar 68 is moved laterally along the platform 49 thereby causing equal movement of the aligning bar 65 through the movement of the U-bolts 66 and 67. The adjusting screw 75 also serves to maintain the aligning bar 65 in adjusted position.

The platform 49 is provided with a pair of slots 81 and 82 these slots extending transversely along the platform, the slot 81 being located near the front of said platform and the slot 82 being located near the center of said platform. These slots are provided for receiving the camera set screw for thereby securing the camera to the platform. The provision of the pair of slots provides for attaching different makes, sizes and types of cameras to the platform.

Mounted upon the rods 27 and 28 between the light bracket 32 (see Figures 1, 15 and particularly 6) and the camera carriage 40 is a camera aligning member generally indicated as 85. This aligning member consists of a cross member 86 having slide portions 87 and 88 fitting upon the rods 27 and 28. This device is secured in place by means of a clamp 89 which extends between the rods 27 and 28, this clamp including a screw 90 which extends through the cross member 86 to a nut 91. The cross member 86 is formed integrally with side members 92 and 93 which merge at their upper ends to form a ring 95 which is adapted to support a transparent circular target 96. This target member 96 is frictionally held in place by means of a ring 97 (see Figure 15) which fits into the circular aperture. It will be apparent that by removing the ring 97 the target member 96 may be removed from the ring 95. The center of the target is aligned with the center of the sheet 6.

When it is desired to make titles for motion picture film, the camera is mounted upon the camera platform, being secured thereto by a screw passing through either the slots 81 or 82, depending upon the particular type and make of camera employed, and threaded into the base of the camera. The aligning member 85 is then moved along the track formed of rods 27 and 28 until the target 96 is closely adjacent to the lens holder of the camera. The camera is then raised or lowered as required by rotating the nob 56 until the camera lens is aligned vertically with the center of the target 96. It will be understood that the target 96 is provided with suitable markings so as to facilitate the centering of the camera lens with respect to this target. During the making of this vertical adjustment, it may be necessary to slide the aligning member 85 along the rods 27 and 28 due to the longitudinal movement of the camera platform which accompanies the vertical movement thereof. After this vertical adjustment has been made, the camera is then horizontally adjusted by rotating the nob 76, rotation of this nob causing lateral movement of the aligning bar 65, and at this time the camera must be held against this aligning bar. After the camera has been aligned both vertically and horizontally the set screw which extends through the slot 81 or 82 is tightened for holding the camera in place. The target member 96 is then removed, or, alternatively, the entire aligning member 85 may be removed from the rods 27 and 28 by loosening the clamp nut 91.

It will be understood that the desired title is then applied to the title holder 6, or if desired, different titles may be applied to this title holder (assuming that the title holder is of opaque material), there being one title on each side. If it is desired to rotate the title holder about a horizontal axis for thereby changing from one title to the other while the camera is in operation, the title holder will be supported in place by means of the trunnion screws 18, and the locking elements are shifted into locking engagement with the frame 7 to hold the title holder in vertical position. The lights 33 and 34 are then adjusted so as to secure the desired lighting effect. The camera is then placed into operation, and, after the desired period, the locking elements 26 are released and the title holder 7 is rotated slowly through 180 degrees, thereby bringing the other side of the title holder and thus the other title into view for recording on the film.

If it is desired to change the title by rotating it about a vertical axis instead of a horizontal axis, the screws 18 are removed and instead, the title holder 7 is secured to the U-clamp device illustrated in Figures 4 and 5. The operation of this arrangement is the same as described above except that the title holder revolves about a different plane for securing a different effect. The arrangement described therefor provides for securing a plurality of different camera effects with substantially the same apparatus. It will be noted that the lock 26 serves to hold the title holder 7 in place when it is supported either by the trunnion screws 18 or the U-clamp device 23.

Also, if desired, the camera carriage, after the camera lens is properly aligned on the support, may be moved horizontally on the rods 27 and 28 into close proximity with the title supported on the sheet 6. The camera may be set in motion to record the title, but because the lens of the camera is close to the title, only the very center of the title will be recorded. The carriage may then be slowly moved rearwardly while the camera is in operation, until the same is as far from the title as the bracket 29 will permit. The result obtained by this operation is that, at first, only that portion of the title which is in the center of the sheet 6 will be recorded, and because the lens is so close to the title the letters in the title will be very large. As the camera is gradually moved rearwardly, more of the title is recorded on the film and the letters gradually become smaller. By the time that the camera is in its rearmost position, the entire title is recorded on the film. Reversing this procedure, the carriage may be positioned adjacent to the bracket 29, the camera set in motion, and while the camera is in motion the same may be moved forwardly on the carriage to cut down the title field. Thus, by moving the camera to and from the title, and by rotating the title about either a horizontal or vertical axis, and by changing the adjustment of the lighting, an unlimited number of unusual title effects may be recorded on the film. Also, which is probably more important, the lens is properly aligned with the title during any of the movements above mentioned of either the camera or the title.

The above operation of the apparatus has been made assuming that the camera employed is of the focusing type. In the event that the camera is of the fixed focus type, the title holder 7 will usually be too close to the camera to obtain satisfactory results. In such a case, it is necessary to employ an additional lens between the camera and the title holder. This additional lens may be supported readily by the aligning member 85, such lens replacing the target 96.

Because of the type of mounting of the aligning member 85 on the supporting rods 27 and 28, the aligning member may be moved to and from the title holder as the camera carriage is moved, so that the same unusual titling effects may be recorded on the film wherein a camera having a fixed focusing lens is employed as that previously mentioned above wherein the camera employed has a focusing lens.

From the foregoing description it will be apparent that the present invention provides a unitary device for making motion picture titles. This device provides for use of any type or make of camera by the provision of the camera support which provides for both horizontal and vertical adjustment of the camera with respect to the title holder. It will also be apparent that while these adjustments are being made, the aligning member 85 facilitates this process and positively indicates when the camera is properly aligned with the center of the title holder.

While one embodiment of the invention has been shown and described, it is to be understood that various modifications thereof may be apparent to those skilled in the art without departing from the spirit and scope of this invention, and, therefore, the same is only to be limited by the scope of the prior art and the appended claims.

I claim:

1. In a titling apparatus for motion pictures, a base, means for supporting a title mounted on said base, a camera supporting platform mounted on said base in spaced relation to said title supporting means, means adapted to vertically adjust said platform, and a movable camera aligning bar mounted on said platform and means for moving said aligning bar for transversely adjusting a camera in relation to said platform and said title supporting means.

2. In a titling apparatus for motion pictures, a base, means for supporting a title mounted on said base, a camera platform slidably mounted on said base through a plurality of pivoted connecting arms, gear means for raising and lowering said pivoted connecting arms to thereby vertically adjust said camera platform, and an aligning member mounted on said base between said title supporting means and said camera supporting platform for aligning the camera with the title, and means on said aligning member for supporting an auxiliary lens in proper alignment with the camera and the title.

3. In a titling apparatus for motion pictures, a base, means for supporting a title mounted on said base, said means being capable of rotation, a camera supporting platform mounted on said base in spaced relation to said title supporting means, means adapted to vertically adjust said platform, and a movable camera aligning bar mounted on said platform and means for moving said aligning bar for transversely adjusting a camera in relation to said platform and said title supporting means.

4. In a titling apparatus for motion pictures, a base, means for supporting a title mounted on said base, a camera supporting platform slidably mounted on said base for movement to and from said title supporting means, means adapted to vertically adjust said platform, and a movable camera aligning bar mounted on said platform and means for moving said aligning bar for transversely adjusting a camera in relation to said platform and said title supporting means.

5. In a titling apparatus for motion pictures, a base, means for supporting a title mounted on said base, light reflectors pivotally connected to said base for horizontal movement in relation to said title supporting means, a camera supporting platform slidably mounted on said base for movement to and from said title supporting means, means adapted to vertically adjust said platform, and a movable camera aligning bar mounted on said platform and means for moving said aligning bar for transversely adjusting a camera in relation to said platform and said title supporting means.

6. In a titling apparatus for motion pictures, a base, means for supporting a title mounted on said base, a camera supporting platform slidably mounted on said base for movement to and from said title supporting means, means adapted to vertically adjust said platform, means mounted on said platform for horizontally adjusting a camera in relation to said platform and said title supporting means, and an aligning member mounted on said base between said title supporting means and said camera supporting platform for aligning the camera with the title, and means on said aligning member for supporting an auxiliary lens in proper alignment with the camera and the title.

7. In a titling apparatus for motion pictures, a base, means for rotatably supporting a title mounted on said base, a camera supporting platform slidably mounted on said base for movement to and from said title supporting means, means adapted to vertically adjust said platform, means mounted on said platform for horizontally adjusting a camera in relation to said platform and said title supporting means, and an aligning member mounted on said base between said title supporting means and said camera supporting platform for aligning the camera with the title, and means on said aligning member for supporting an auxiliary lens in proper alignment with the camera and the title.

8. In a titling apparatus for motion pictures, a base, means for supporting a title mounted on said base, light reflectors pivotally connected to said base for horizontal movement in relation to said title supporting means, a camera supporting platform slidably mounted on said base for movement to and from said title supporting means, means adapted to vertically adjust said platform, means mounted on said platform for horizontally adjusting a camera in relation to said platform and said title supporting means, and an aligning member mounted on said base between said title supporting means and said camera supporting platform for aligning the camera with the title, and means on said aligning member for supporting an auxiliary lens in proper alignment with the camera and the title.

9. In a titling apparatus for motion pictures, a base, means for supporting a title mounted on said base, light reflectors pivotally connected to said base for horizontal movement in relation to said title supporting means, a camera supporting platform slidably mounted on said base for movement to and from said title supporting means, means adapted to vertically adjust said platform, means mounted on said platform for horizontally adjusting a camera in relation to said platform and said title supporting means, and an upright member mounted on said base having an aperture therein, said aperture being in alignment with the center of said title supporting means, so that when the center of the camera lens is aligned with said aperture, the lens will be centered in relation to the title supporting means.

10. In a titling apparatus for motion pictures, a base, means for rotatably supporting a title mounted on said base, a camera platform slidably mounted on said base through a plurality of pivoted connecting arms, gear means for raising and lowering said pivoted connecting arms to thereby vertically adjust said camera platform, means mounted on said platform for horizontally adjusting a camera in relation to said platform and said title supporting means, and means mounted on said base between said title supporting means and said camera supporting platform for aligning the camera with the title, said means being constructed for supporting an auxiliary lens in proper alignment with the camera and the title.

11. In a titling apparatus for motion pictures, a base, means for supporting a title mounted on said base, light reflectors pivotally connected to said base for horizontal movement in relation to said title supporting means, a camera supporting platform slidably mounted on said base through a plurality of pivoted connecting arms, gear means for raising and lowering said pivoted connecting arms to thereby vertically adjust said camera platform, and a movable aligning bar mounted on said platform and means for moving said aligning bar for transversely adjusting a camera in relation to said platform and said title supporting means.

12. In a titling apparatus for motion pictures, a base, means for supporting a title mounted on said base, light reflectors pivotally connected to said base for horizontal movement in relation to said title supporting means, a camera supporting platform slidably mounted on said base through a plurality of pivoted connecting arms, gear means for raising and lowering said pivoted connecting arms to thereby vertically adjust said camera platform, means mounted on said platform for horizontally adjusting a camera in relation to said platform and said title supporting means, and means mounted on said base between said title supporting means and said camera supporting platform for aligning the camera with the title, said means being constructed for supporting an auxiliary lens in proper alignment with the camera and the title.

13. In a titling apparatus for motion pictures, a base, means for supporting a title on said base, a camera supporting platform slidably mounted on said base thru a plurality of pivoted connecting arms, gear means for raising and lowering said pivoted connecting arms to thereby vertically adjust said camera platform, a movable camera aligning bar located on said platform and means for moving said aligning bar to horizontally adjust said camera relative to said platform and said title supporting means.

14. In a titling apparatus for motion pictures, a base, means for supporting a title on said base, a camera supporting platform slidably mounted on said base through a plurality of pivoted connecting arms, said connecting arms being mounted on cross shafts, a gear mounted on one of said cross shafts capable of rotating the same for raising and lowering the pivoted connecting arms to thereby vertically adjust said camera platform, and a movable aligning bar mounted on said platform and means for moving said aligning bar for transversely adjusting a camera in relation to said platform and said title supporting means.

15. In a titling apparatus for motion pictures, a base, means for supporting a title mounted on said base, light reflectors pivotally connected to said base for horizontal movement in relation to said title supporting means, a camera supporting platform slidably mounted on said base through a plurality of pivoted connecting arms, said connecting arms being mounted on cross shafts, a gear mounted on one of said cross shafts capable of rotating the same for raising and lowering the pivoted connecting arms to thereby vertically adjust said camera platform, and a movable aligning bar mounted on said platform and means for moving said aligning bar for transversely adjusting a camera in relation to said platform and said title supporting means.

16. In a titling apparatus for motion pictures, a base, means for supporting a title on said base, a camera supporting platform slidably mounted on said base through a plurality of pivoted connecting arms, said connecting arms being mounted on cross shafts, a gear mounted on one of said cross shafts capable of rotating the same for raising and lowering the pivoted connecting arms to thereby vertically adjust said camera platform, means mounted on said platform for horizontally adjusting a camera in relation to said platform and said title supporting means, and an aligning member mounted on said base between said title supporting means and said camera supporting platform for aligning the camera with the title, said aligning member having means thereon for supporting an auxiliary lens in proper alignment with the camera and the title.

17. In a titling apparatus for motion pictures, a base, means for supporting a title mounted on said base, light reflectors pivotally connected to said base for horizontal movement in relation to said title supporting means, a camera supporting platform slidably mounted on said base through a plurality of pivoted connecting arms, said connecting arms being mounted on cross shafts, a gear mounted on one of said cross shafts capable of rotating the same for raising and lowering the pivoted connecting arms to thereby vertically adjust said camera platform, means mounted on said platform for horizontally adjusting a camera in relation to said platform and said title supporting means, and an aligning member mounted on said base between said title supporting means and said camera supporting platform for aligning the camera with the title, said aligning member having means thereon for supporting an auxiliary lens in proper alignment with the camera and the title.

18. In a titling apparatus for motion pictures, a base, means for supporting a title mounted on said base, a camera supporting platform slidably mounted on said base through a plurality of pivoted connecting arms, said connecting arms being mounted on cross shafts, a gear mounted on one of said cross shafts capable of rotating the same for raising and lowering the pivoted connecting arms to thereby vertically adjust said camera platform, a movable camera aligning bar located on the underside of said platform, said last mentioned bars being connected through U bolts, a screw threaded through the bar located on the underside of said platform for horizontally moving said last mentioned bar, the movement of said last mentioned bar, through said U bolts, causing horizontal movement of said aligning bar to thereby horizontally adjust the camera relative to said platform and said title supporting means.

20. In a titling apparatus for motion pictures, a plurality of parallel supporting rods, means for supporting a title connected to said rods adjacent to one end thereof, said means being capable of rotating on a horizontal axis and on a vertical axis, a camera supporting platform slidably mounted on said rods through a plurality of pivoted connecting arms, said connecting arms being mounted on cross shafts, a gear mounted on one of said cross shafts capable of rotating the same for raising and lowering the pivoted connecting arms to thereby vertically adjust said camera platform, means on said platform for horizontally adjusting a camera relative to said platform and said title supporting means, and an upright member removably mounted on said parallel supporting rods between said title supporting means and said camera platform having an aperture therein, the center of said aperture being aligned with the center of said title supporting means, so that when the center of the camera lens is in a line with the center of the aperture in the upright member the lens will be centered in relation to the title supporting means.

20. In a titling apparatus for motion pictures, a plurality of parallel supported rods, means for supporting a title connected to said rods adjacent to one end thereof, said means being capable of rotating on a horizontal axis and on a vertical axis, a bracket slidably mounted on said rods, a plurality of arms pivotally connected to said bracket for adjustably supporting a plurality of light reflectors in relation to said title supporting means, a camera supporting platform slidably mounted on said rods through a plurality of pivoted connecting arms, said connecting arms being mounted on cross shafts, a gear mounted on one of said cross shafts capable of rotating the same for raising and lowering the pivoted connecting arms to thereby vertically adjust said camera platform, means on said platform for horizontally adjusting a camera relative to said platform and said title supporting means, and an upright member removably mounted on said parallel supporting rods between said title supporting means and said camera platform having an aperture therein, the center of said aperture being aligned with the center of said title supporting means, so that when the center of the camera lens is in a line with the center of the aperture in the upright member the lens will be centered in relation to the title supporting means.

21. In a titling apparatus for motion pictures, a plurality of parallel supporting rods, means for supporting a title connected to said rods adjacent to one end thereof, said means being capable of rotating on a horizontal axis and on a vertical axis, a camera supporting platform slidably mounted on said rods through a plurality of pivoted connecting arms, said connecting arms being mounted on cross shafts, a gear mounted on one of said cross shafts capable of rotating the same for raising and lowering the pivoted connecting arms to thereby vertically adjust said camera platform, means on said platform for horizontally adjusting a camera relative to said platform and said title supporting means comprising a movable camera aligning bar located on the top of said camera platform and a bar located on the underside of said platform, said last mentioned bars being connected through U bolts, a screw threaded through the bar located on the underside of said platform for horizontally moving said last mentioned bar, the movement of said last mentioned bar, through the U bolts, causing horizontal movement of said aligning bar, and an upright member removably mounted on said parallel supporting rods between said title supporting means and said camera platform having a circular aperture therein, the center of said aperture being aligned with the center of said title supporting means, so that when the center of the camera lens is in a line with the center of the aperture in the upright member, the lens will be centered in relation to the title supporting means.

22. In a titling apparatus for motion pictures, a plurality of parallel supporting rods, means for supporting a title connected to said rods adjacent to one end thereof, said means being capable of rotating on a horizontal axis and on a vertical axis, a bracket slidably mounted on said rods, said bracket having a plurality of arms pivotally connected thereto for adjustably supporting a plurality of light reflectors independently of each other in relation to said title supporting means, a camera supporting platform slidably mounted on said rods through a plurality of pivoted connecting arms, said connecting arms being mounted on cross shafts, a gear mounted on one of said cross shafts capable of rotating the same for raising and lowering the pivoted connecting arms to thereby vertically adjust said camera platform, means on said platform for horizontally adjusting a camera relative to said platform and said title supporting means comprising a movable camera aligning bar located on the top of said camera platform and a bar located on the underside of said platform, the last mentioned bars being connected through U bolts, a screw threaded through the bar located on the underside of said platform for horizontally moving said last mentioned bar, the movement of said last mentioned bar, through said U bolts, causing horizontal movement of said aligning bar, and an upright member removably mounted on said parallel supporting rods between said title supporting means and said camera platform having a circular aperture therein, the center of said aperture being aligned with the center of said title supporting means, so that when the center of the camera lens is in a line with the center of the aperture in the upright member, the lens will be centered in relation to the title supporting means.

WILLIAM J. BROWN, Jr.